United States Patent
Huotari et al.

(10) Patent No.: US 9,185,155 B2
(45) Date of Patent: Nov. 10, 2015

(54) INTERNET PRESENCE FOR A HOME NETWORK

(75) Inventors: Allen J. Huotari, Garden Grove, CA (US); Kendra S. Harrington, Bainbridge Island, WA (US); Thomas J. Cowling, Des Moines, WA (US); Stephen Kelly, Redmond, WA (US)

(73) Assignee: Cisco Technology, Inc., San Jose, CA (US)

(*) Notice: Subject to any disclaimer, the term of this patent is extended or adjusted under 35 U.S.C. 154(b) by 113 days.

(21) Appl. No.: 13/606,700

(22) Filed: Sep. 7, 2012

(65) Prior Publication Data

US 2014/0071849 A1    Mar. 13, 2014

(51) Int. Cl.
*H04L 12/28* (2006.01)
*H04L 29/08* (2006.01)
*H04L 29/06* (2006.01)

(52) U.S. Cl.
CPC ............. *H04L 67/02* (2013.01); *H04L 12/28* (2013.01); *H04L 12/2869* (2013.01); *H04L 67/2814* (2013.01); *H04L 69/22* (2013.01)

(58) Field of Classification Search
CPC ........... G06F 9/54; G06F 9/544; G06F 9/545; G06F 9/547; H04W 84/12; H04W 88/06; H04L 45/00; H04L 45/04; H04L 12/66; H04L 12/4633; H04L 65/1069; H04L 47/10
USPC ......... 370/338, 351, 352, 354, 401, 411, 229; 370/254; 719/312, 319; 707/654; 715/736
See application file for complete search history.

(56) References Cited

U.S. PATENT DOCUMENTS

| | | | |
|---|---|---|---|
| 6,035,105 A * | 3/2000 | McCloghrie et al. | 709/236 |
| 6,701,378 B1 * | 3/2004 | Gilhuly et al. | 709/249 |
| 6,850,980 B1 | 2/2005 | Gourlay | |
| 6,917,626 B1 * | 7/2005 | Duvvury | 370/466 |
| 7,251,681 B1 | 7/2007 | Gourlay | |
| 7,257,634 B2 | 8/2007 | Colby et al. | |
| 7,554,997 B1 * | 6/2009 | Schlichter et al. | 370/402 |
| 7,646,772 B2 | 1/2010 | Sivabalan et al. | |
| 7,719,959 B2 | 5/2010 | Shah et al. | |
| 8,214,744 B1 * | 7/2012 | Frank et al. | 715/748 |
| 2002/0010818 A1 * | 1/2002 | Wei et al. | 710/62 |
| 2004/0015940 A1 * | 1/2004 | Heisey et al. | 717/168 |
| 2004/0205251 A1 * | 10/2004 | Wiles et al. | 709/250 |
| 2005/0021839 A1 * | 1/2005 | Russell et al. | 709/238 |
| 2005/0107985 A1 * | 5/2005 | Agrawal et al. | 702/186 |
| 2005/0108428 A1 * | 5/2005 | Cornet et al. | 709/243 |
| 2005/0188055 A1 * | 8/2005 | Saletore | 709/218 |
| 2006/0164978 A1 * | 7/2006 | Werner et al. | 370/229 |
| 2006/0270448 A1 * | 11/2006 | Huotari et al. | 455/552.1 |

(Continued)

*Primary Examiner* — Edan Orgad
*Assistant Examiner* — Steven Willmore
(74) *Attorney, Agent, or Firm* — Parker Ibrahim & Berg LLC; James M. Behmke; Stephen D. LeBarron

(57) ABSTRACT

In one embodiment, a first interface of a switch interconnects with a broadband modem within a wide area network (WAN), while a second interface of the switch interconnects with a WAN interface of a router, where the router provides a gateway between the WAN and a local area network (LAN). Additionally, a web server is provided at the switch, where the web server is reachable to the WAN on the first interface and to the LAN on the second interface. The switch may then inspect traffic received at the first and second interfaces, and determines, based on inspecting, whether to transparently forward the traffic between the first and second interfaces or to redirect the traffic to the web server.

20 Claims, 8 Drawing Sheets

(56) References Cited

U.S. PATENT DOCUMENTS

| | | | |
|---|---|---|---|
| 2007/0022185 A1* | 1/2007 | Hamilton et al. | 709/220 |
| 2007/0214083 A1* | 9/2007 | Jones et al. | 705/41 |
| 2008/0069121 A1* | 3/2008 | Adamson et al. | 370/401 |
| 2008/0082662 A1* | 4/2008 | Dandliker et al. | 709/225 |
| 2008/0155083 A1* | 6/2008 | Pichetti et al. | 709/223 |
| 2009/0034509 A1* | 2/2009 | Krapp et al. | 370/352 |
| 2009/0122787 A1* | 5/2009 | Huotari et al. | 370/352 |
| 2010/0115415 A1* | 5/2010 | Hickey | 715/736 |
| 2010/0205152 A1* | 8/2010 | Ansari et al. | 707/654 |
| 2011/0299538 A1* | 12/2011 | Maruta | 370/392 |
| 2012/0166628 A1* | 6/2012 | Kullos | 709/224 |
| 2012/0172071 A1* | 7/2012 | Arcidiacono et al. | 455/500 |
| 2012/0269059 A1* | 10/2012 | Gupta et al. | 370/229 |
| 2013/0232251 A1* | 9/2013 | Pauley | 709/224 |

* cited by examiner

INTERNET PRESENCE FOR A HOME NETWORK

TECHNICAL FIELD

The present disclosure relates generally to computer networks, and, more particularly, to cloud computing concepts and home/user networks.

BACKGROUND

As users grow and mature in their Internet knowledge and experience, they begin to realize that any given home network can be part of "the cloud". Current thinking and positioning of "the cloud", however, is that it is something "out there, outside the home". If so, then one person's home network is part of another person's "cloud" and vice versa. In actuality, all home networks should be part of the cloud.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first interface of a switch interconnects with a broadband modem within a wide area network (WAN), while a second interface of the switch interconnects with a WAN interface of a router, where the router provides a gateway between the WAN and a local area network (LAN). Additionally, a web server is provided at the switch, where the web server is reachable to the WAN on the first interface and to the LAN on the second interface. The switch may then inspect traffic received at the first and second interfaces, and determines, based on inspecting, whether to transparently forward the traffic between the first and second interfaces or to redirect the traffic to the web server. In this manner, as one example example, a home network (LAN) may establish presence on the Public Internet (WAN), allowing secure access to personal home-based content from anywhere via the in-home web server representing the home network on the Internet.

Description

A computer network is a geographically distributed collection of nodes interconnected by communication links and segments for transporting data (e.g., voice, video, and/or data) between end nodes, such as personal computers and workstations, or other devices, such as sensors, etc. Many types of networks are available, ranging from Local Area Networks (LANs) to Wide Area Networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, Synchronous Optical Networks (SONET), Synchronous Digital Hierarchy (SDH) links, etc.

Figure 1:
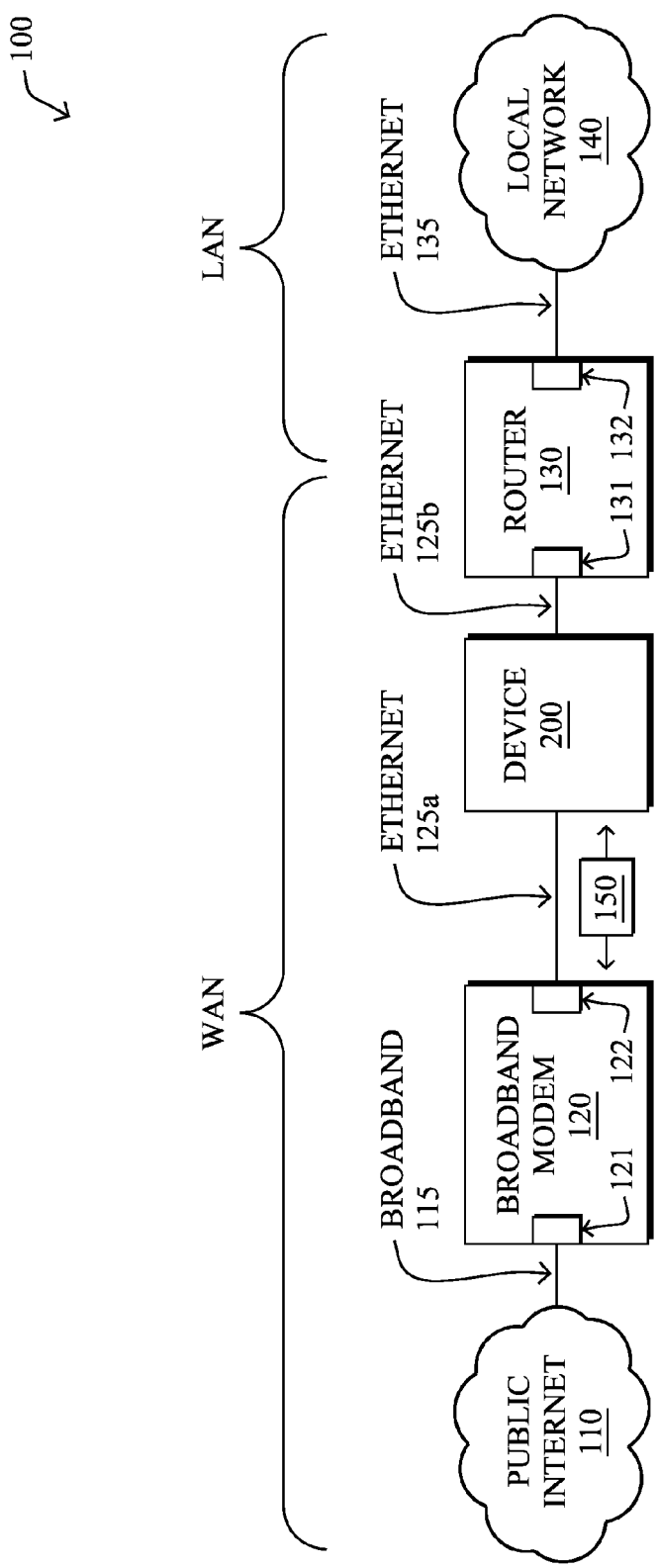
FIG. 1 illustrates an example computer network.

FIG. 1 is a schematic block diagram of an example computer network 100 illustratively comprising various sites and devices, particularly where a local network or LAN 140 (e.g., a home, school, business, etc.) may be interconnected to a global network (e.g., the public Internet) or WAN 110 via a collection of devices. For instance, a broadband link 115 from the Internet 110 may be converted by a corresponding broadband modem (e.g., cable modem) 120 (interface 121) into an Ethernet link 125a (interface 122), and vice versa. Additionally, a router/gateway 130 may separate the WAN Ethernet link 125b (on a WAN interface 131) from the LAN Ethernet link 135 (on a LAN interface 132), thus creating the divide between the WAN (e.g., Internet 110) and LAN (e.g., local network 140), as will be readily appreciated by those in the art.

Note that the links between the devices may generally be wired or wireless. Data packets (or frames) 150 may be exchanged among the devices of the computer network 100 over the links using predefined network communication protocols such as certain known wired protocols, wireless protocols, or other protocols where appropriate. In this context, a protocol consists of a set of rules defining how the nodes interact with each other. In general, the connections to/from and between the networks may comprise IPv4 and/or IPv6 (or one or more translations between the two), without being specifically distinguished herein. Those skilled in the art will understand that any number of nodes, devices, links, etc. may be used in the computer network, and that the view shown herein is for simplicity. Also, those skilled in the art will further understand that while the network is shown using a certain device naming convention, the network 100 and the device names are merely an example illustration that is not meant to limit the disclosure.

According to the techniques herein, a device 200 may be placed within network 100 that physically resides between a router 130 and a broadband modem 120. Although generally intended to be placed physically within the local network's location (e.g., within the user's home), the device logically resides on the WAN side of the router, and is thus reachable on the public Internet from both inside the LAN (e.g., home/internal) users and also by outside the LAN (e.g., WAN/external) users (i.e., is on both the public and private "side" of the network). Essentially, this device 200 is physically connected serially between Ethernet links 125a and 125b, but as described below, it may be more accurately understood as being logically in parallel to the router. In particular, as described herein, device 200 comprises an in-home web server that enables a local/home network to quickly and easily establish presence on the Public Internet (e.g., especially an IPv6 Internet), allowing secure access to local (e.g., personal home-based) content from anywhere, without requiring firewall configurations or special service subscriptions. In addition, the device may also represent the public Internet (e.g., Cloud functions) locally in the home, such as a caching server/service. Thus, instead of promoting a "centralized" cloud paradigm, the device 200 in accordance with the techniques herein promotes a "distributed" cloud paradigm that complements the "centralized" functionality (i.e., instead of the cloud being "out there", the cloud is "everywhere").

Figure 2:
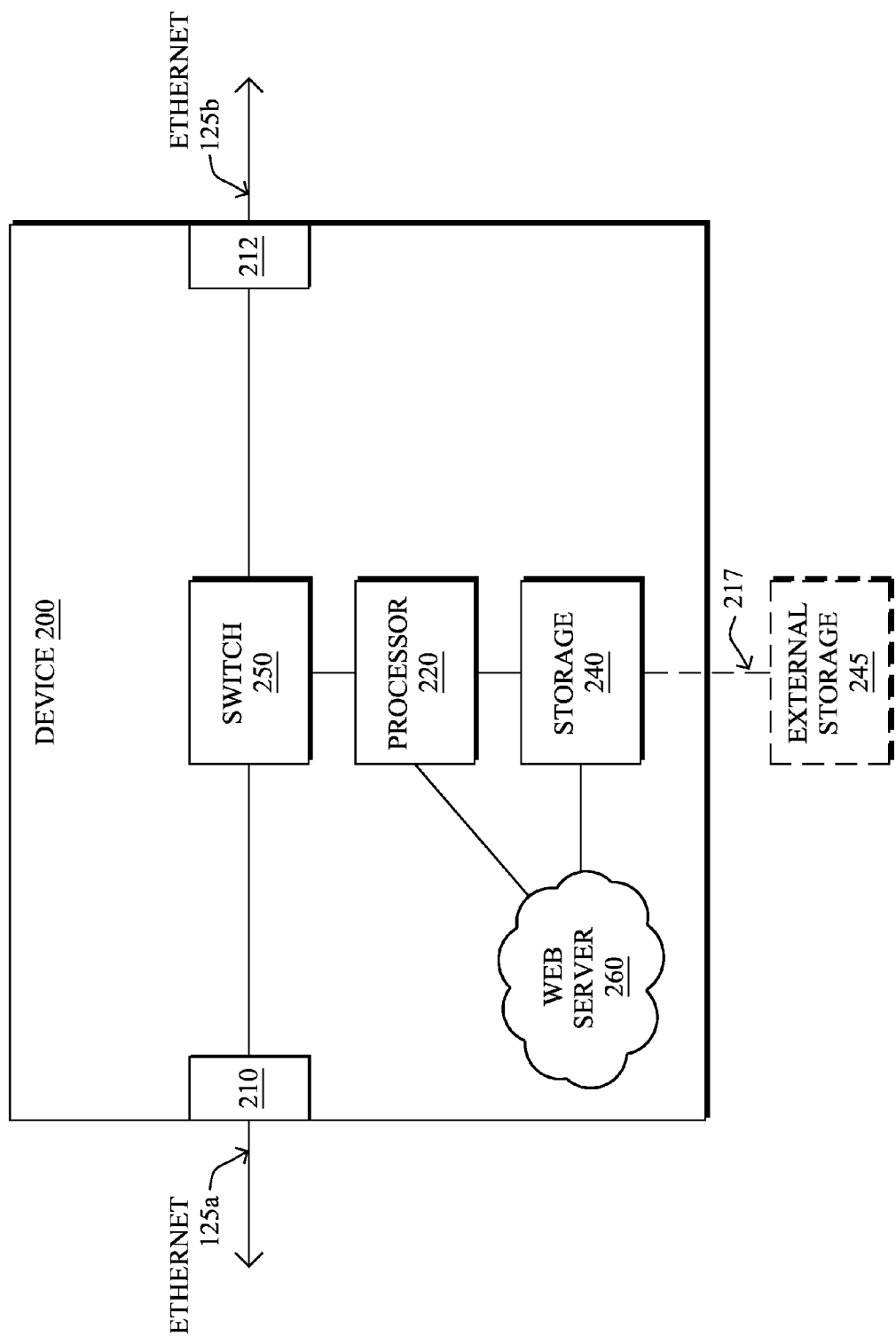
FIG. 2 illustrates an example device.

FIG. 2 is a schematic block diagram of an example device 200 that may be used with one or more embodiments described herein. The device may comprise a first network interface 210 and a second network interface 212, where illustratively the first interface is interconnected with the broadband modem 120, and the second interface is interconnected with a WAN interface 131 of the router 130. The network interfaces 210 and 212 (and optionally others) comprise the mechanical, electrical, and signaling circuitry for communicating data over links coupled to the network 100. The network interfaces may be configured to transmit and/or receive data using one or more communication protocols. Note, further, that the devices may have two different types of network connections, e.g., wireless and wired/physical connections, and that the view herein is merely for illustration.

In addition, the device 200 may generally comprise a switch 250 between the first and second interfaces, which may be controlled by at least one processor 220 comprising hardware elements or logic elements adapted to execute software programs and manipulate data structures stored within a storage location 240 or other memory. For example, as shown, a web server process (or module) 260 (reachable to the WAN on the first interface 210 and to the LAN on the second interface 212) may be provided as a separate process/function from the switching capabilities of switch 250, though each of the web server and switch may be processes stored within the same memory on the device, and executed by the process 220. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Note that the provided storage 240, particularly with regard to storage associated with the web server accessible to the WAN and the LAN (e.g., files, data, etc.) may be included internally within the device (internal storage), or connected externally, such as local external storage 245 via a port 217 (e.g., a universal serial bus (USB) port), or else virtually connected via the WAN to traditional cloud-based storage (WAN-based external storage).

Figure 3:
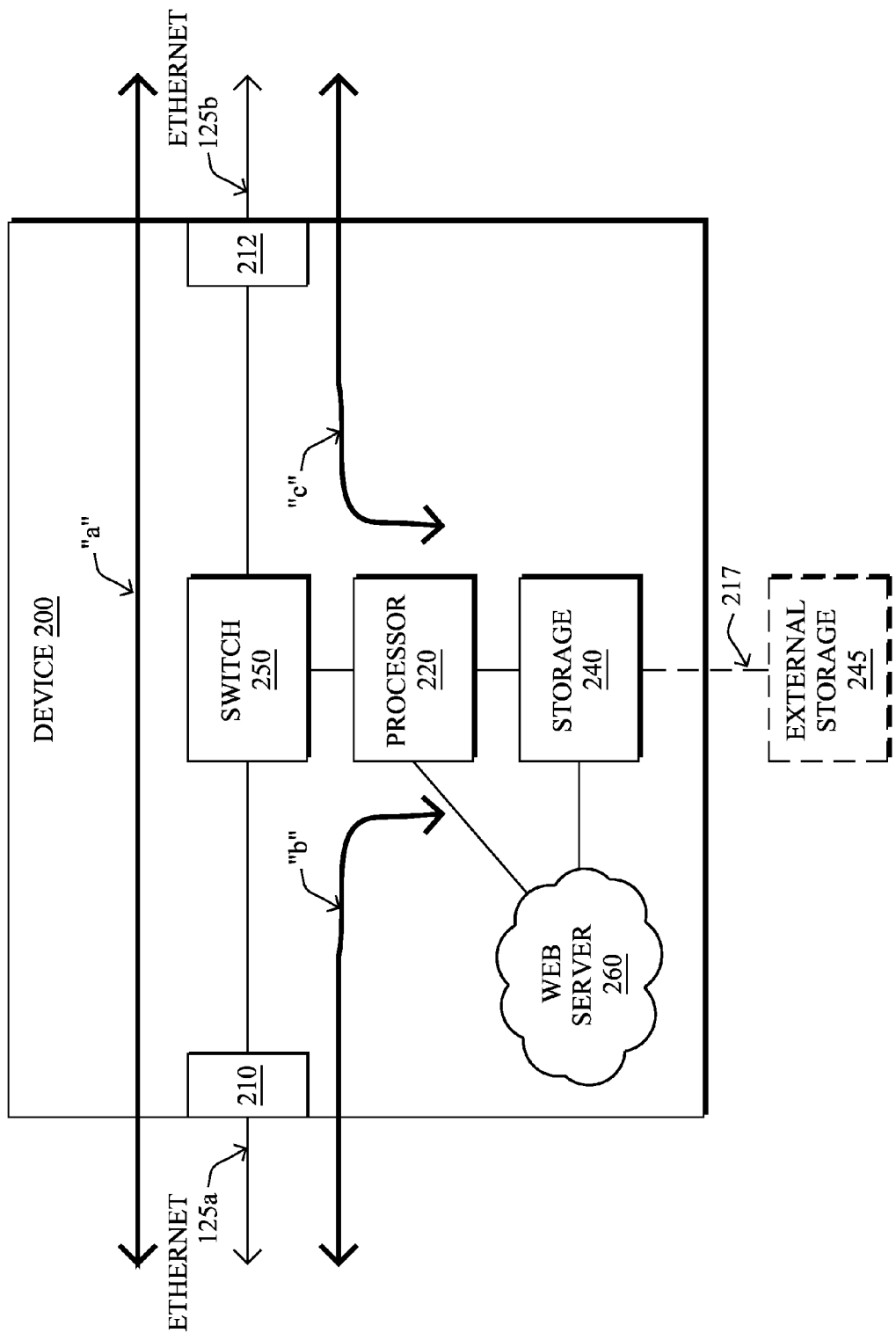
FIG. 3 illustrates an example flow of traffic.

Operationally, the device 200 is an independent device on the Internet where each packet and/or TCP session received at the device on either the first or second interface is inspected, such that a decision may be made (determining per-packet or per-session, respectively) whether to transparently forward the packet between the first and second interfaces or redirect it to an internal server or service, e.g., web server 260. That is, downstream (inbound Internet) traffic destined for inside the local network (e.g., home) is transparently bridged via the switch 250 in the device 200 and goes to the local router 130, while upstream (outbound Internet) traffic destined for outside the local network is also transparently bridged from the router through the device 200. This is shown as flow "a" in FIG. 3. However, as described below, traffic destined for the device 200 may be forwarded (e.g., "intercepted" and redirected) accordingly (flows "b" and "c" of FIG. 3), such as when the web server 260 and/or storage 240 is specifically being accessed.

Illustratively, the device 200 allows each local network 140 (e.g., home) to become a publicly accessible (yet protected) network, like a micro-autonomous-system, where local storage and/or resources are made publicly available, and vice versa, where public storage and/or resources (e.g., cloud functions) are made locally available (e.g., for a caching server/service). Essentially, the device 200 appears as a web server both to the public Internet (users outside the local network/home), and to users inside the local network/home.

The following use cases illustrate various features and functionality of the device 200 according to one or more embodiments herein.

USE CASE 1: John is at home. John stores a large work file on his local device 200. When John leaves home, he can access the file from anywhere on the Internet.

USE CASE 2: Bill works with John. John has given Bill access (e.g., username, password, address, etc.) to his device 200 and to the file. Bill accesses the file and makes changes, and uploads the revised file to John's device 200 so that John can see the revisions.

USE CASE 3: Alice works with Bill and John. John and Alice each have a device 200 and have given each other (and Bill) access to the work files therein. Alice accesses Bill's revised file on John's device 200 and makes additional revisions, and posts her revised file on her own device 200. Bill and John both review her revisions.

USE CASE 4: Alice and Bill have tied their devices 200 together to create one larger network. The two devices 200 synchronize real-time and both devices 200 maintain the latest copy. In other words, one or more files may be synchronized between a local web server 260 (e.g., Alice's) and a remote web server 260 (e.g., Bill's), such that local access may be provided to the files from the remote server by the local server.

USE CASE 5: Similar to use case 4, the device 200 may also be configured to synchronize with a WAN-based sever such as a commercial cloud service. For example, Alice has a movie streaming application at home, and has selected several movies in her movie streaming queue. A movie streaming application on her device 200 may automatically start downloading every movie in her queue (temporarily) so that when she starts to watch a movie, it is playing from her local device 200, rather than from the movie streaming server (which is faster because it's on her local network, and saves the movie streaming company bandwidth as well). Use case 5 is also an example of how the techniques herein may allow the device 200 to be host for a collection of "widgets" (e.g., "bots") that retrieve content for the user (including making connections to other such devices 200).

USE CASE 6: Alice stores all her movies and photos on a separate folder in her device storage 240 so that she can access the files while in the home as well as on the road. When she uses her smartphone, she can access the files at the same address regardless of if she is connected to the WAN (e.g., a 3G/4G network) or to her home LAN (e.g., her Wi-Fi network).

Notably, as an example of how the functionality of the device 200 herein may be viewed by users, consider this comparison: typing "AliceCloud" into a browser while on Alice's home network will resolve locally (within the network) to the internal web servers of Alice's device 200. If not on the local network (e.g., while traveling), typing "AliceCloud" will be redirected to Alice's device 200 from the WAN.

Figure 4A:
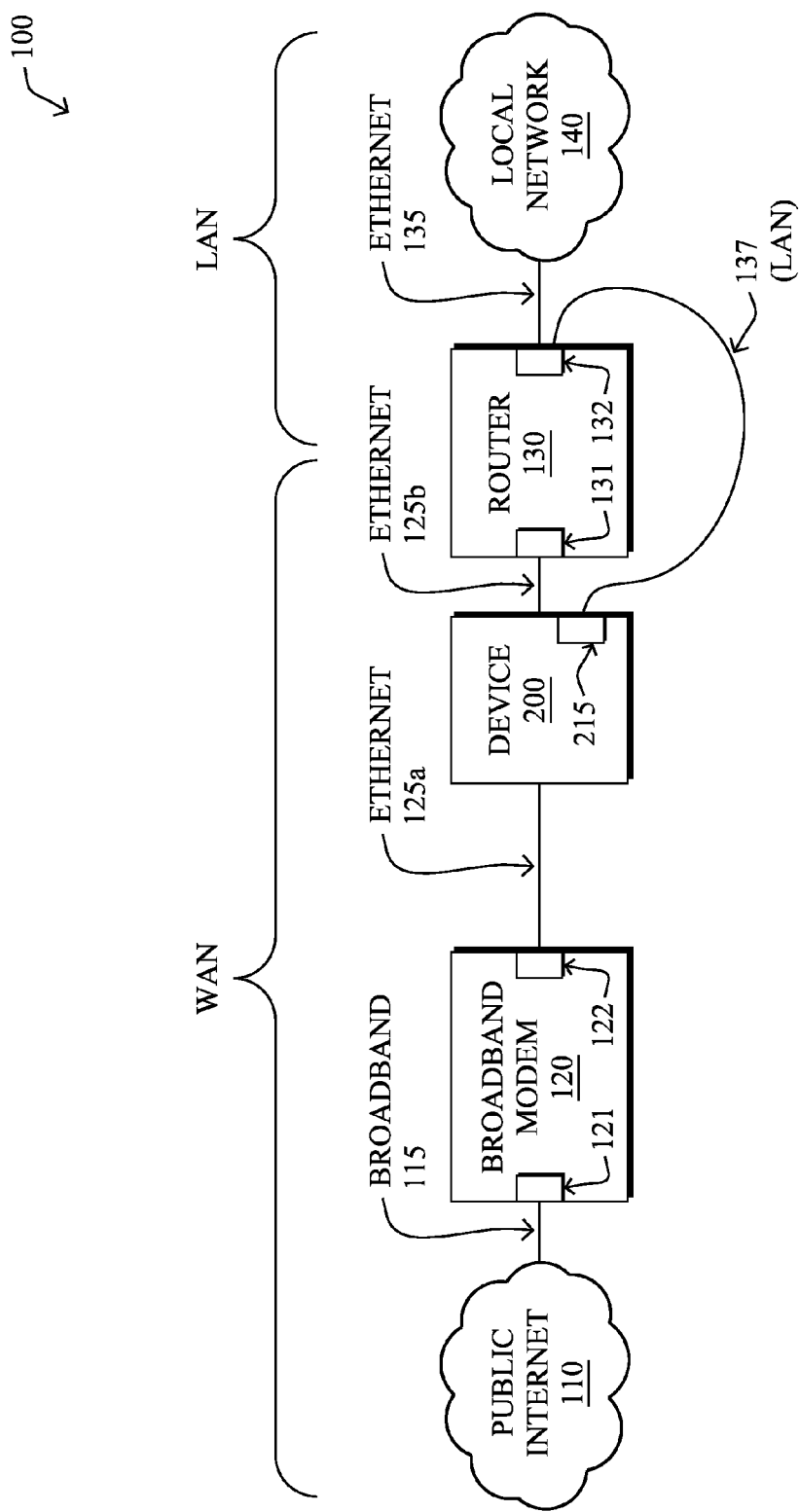
FIGS. 4A-4B illustrate examples of local area network (LAN) connectivity within the computer network.
Figure 4B:
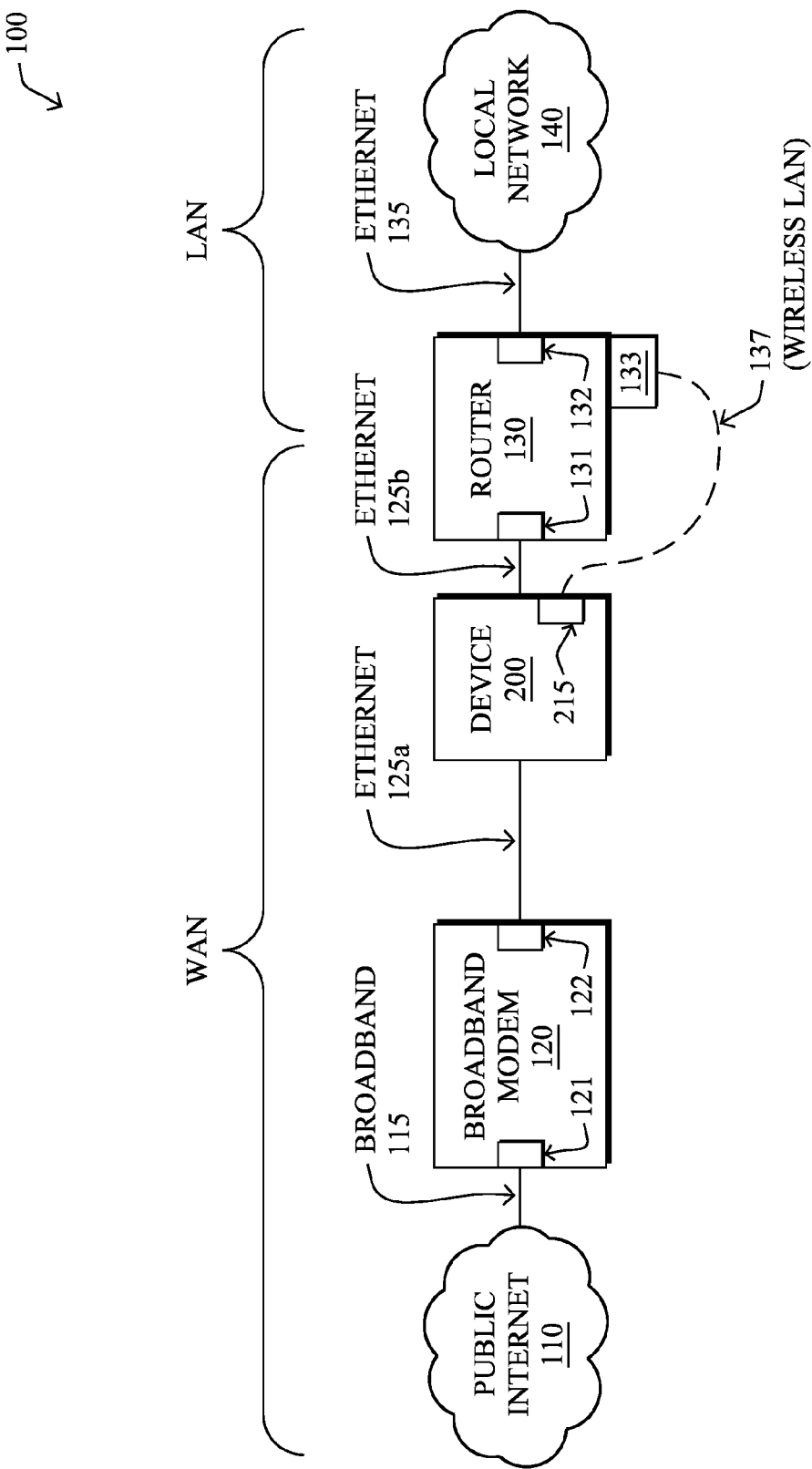

It is important to note that the device 200 may be attached directly to the local network via the internal switch 250, such as via connecting a third interface 215 (logically isolated from the first and second interfaces 210 and 212) to one of the LAN side ports/interfaces 132 in the local router 130, as shown in FIG. 4A (LAN link 137). This allows private addressing to be used for local configuration purposes for the switch 250 and/ or web server 260, as well as for accessibility if desired. (Essentially the LAN interface 215 is on both a separate virtual LAN and IP subnet.) In particular, the device 200 can obtain a private IP address (LAN address) on the LAN network port 132, and thus be directly visible/reachable by devices in the local network 140, but still be logically isolated from the WAN side of the router and public IP. In addition, FIG. 4B illustrates a scenario where the local LAN interface 215 could be wirelessly connected to the router at a wireless interface (access point) 133.

Figure 5:
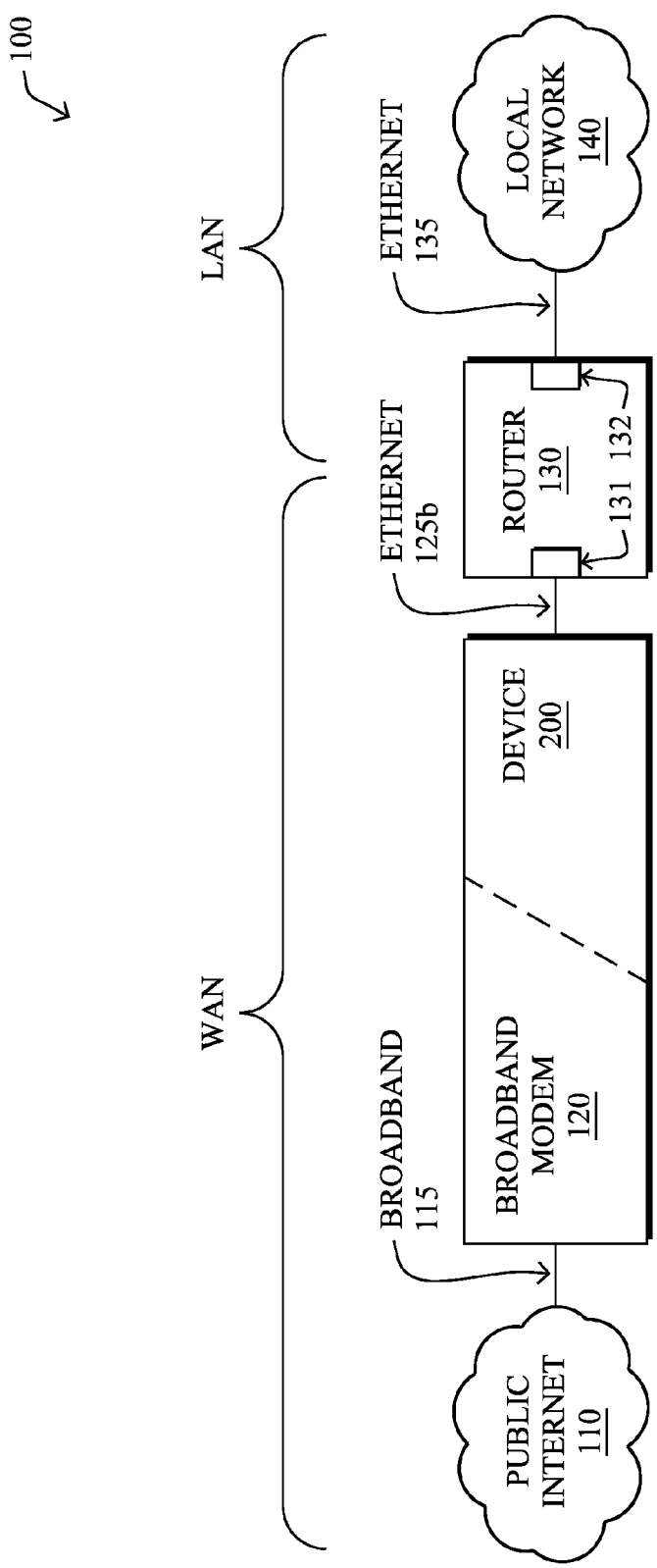
FIGS. 5-6 illustrate examples of physically collocated devices.
Figure 6:
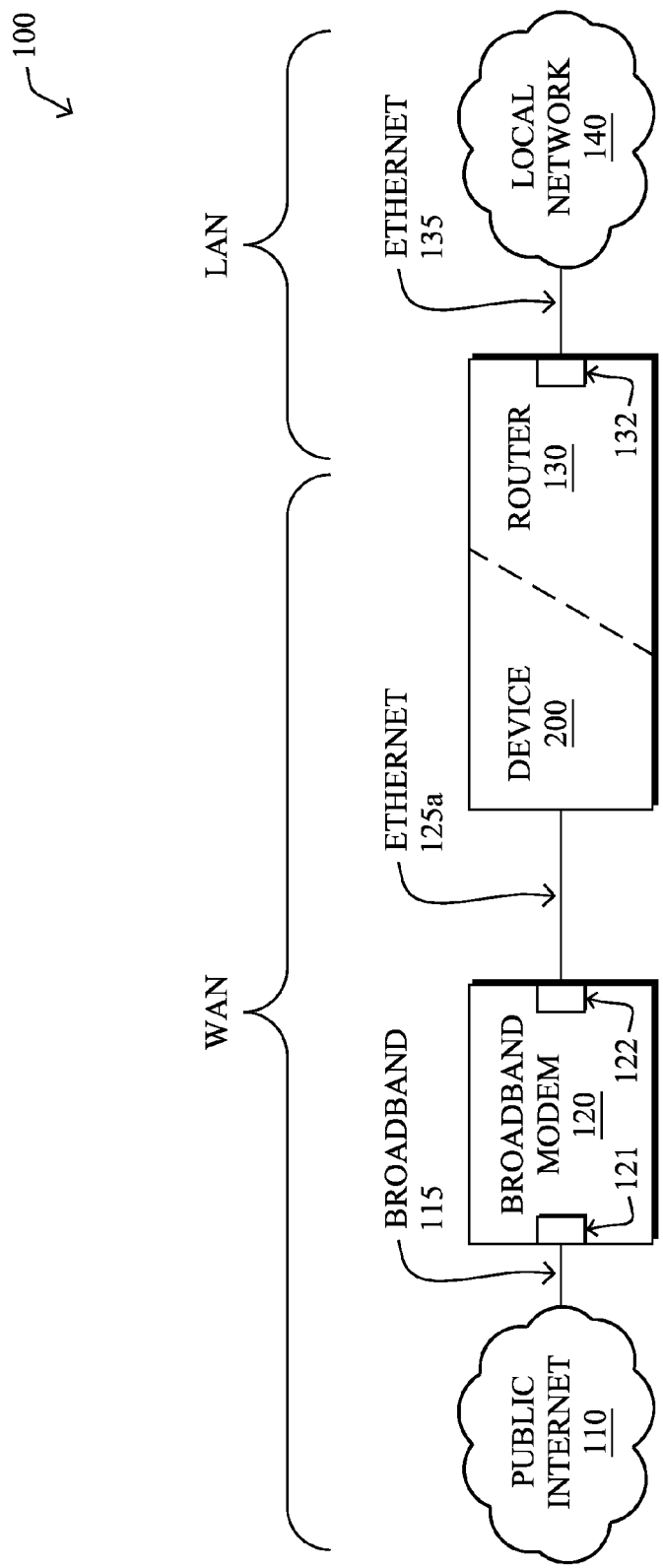

According to one or more embodiments herein, the broadband modem 120 may be integrated with device 200 (i.e., physically collocating the device 200/switch 250 with the modem 120) as shown in FIG. 5. Alternatively, as shown in FIG. 6, the router 130 may be integrated with device 200, with adequate logical provisioning to manage WAN-side traffic and LAN-side traffic via a switch 250 (e.g., virtualized), accordingly. Still further, the broadband modem 120, device 200, and router 130 may all be collocated within a single physical device.

Figure 7:
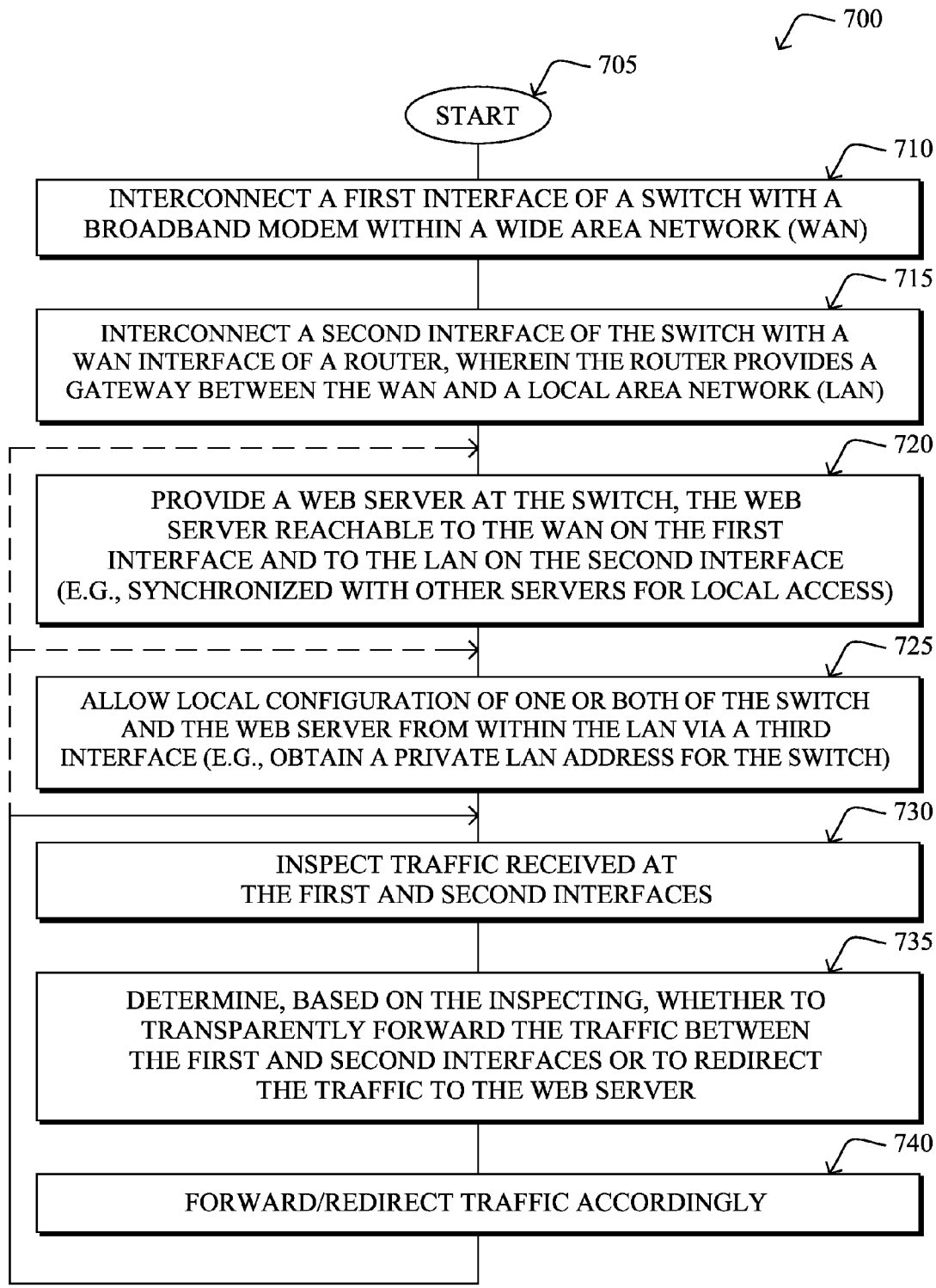
FIG. 7 illustrates an example simplified procedure for providing Internet presence for a home network.

FIG. 7 illustrates an example simplified procedure 700 for providing Internet presence for a home network in accordance with one or more embodiments described herein, particularly from the perspective of the device 200. The procedure 700 may start at step 705, and continues to step 710, where, as described in greater detail above, a first interface 210 of a switch 250 (device 200) is interconnected with a broadband modem 120 within a WAN (e.g., 110). Additionally, in step 715, a second interface 212 of the switch is interconnected with a WAN interface 131 of a router 130, where the router provides a gateway between the WAN and a LAN (e.g., 140). Further, in step 720, a web server 260 at the switch 250 (or, generally, device 200), where the web server is reachable to the WAN on the first interface and to the LAN on the second interface. Note that as described above, the web server may synchronize files with other servers for local access, such as with other devices 200 or other WAN-based servers within the public Internet 110. Moreover, local configuration of one or both of the switch and the web server from within the LAN may be allowed in step 725 via a third interface 215 (e.g., obtaining a private LAN address for the switch).

Upon receipt of traffic on either interface 210/215 of the device 200, the switch 250 (e.g., processor 220) may inspect the received traffic in step 730 to determine, in step 735 based on the inspection, whether to transparently forward the traffic between the first and second interfaces or to redirect the traffic to the web server, as described in detail above. As such, in step 740, the switch/device may forward or redirect the traffic to the appropriate destination, accordingly. The procedure 700 may then return to step 730 to receive additional traffic. Alternatively, the procedure may also return to step 725 to receive additional configuration, or else to step 720 to maintain synchronization of files between servers.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 700 is described separately from operation of the broadband modem and/or router, the procedure is not meant to be mutually exclusive, and as noted above, the switch may be physically collocated (and functionally co-operational) with the broadband modem and/or router, accordingly.

The techniques described herein, therefore, provide Internet presence for a home network. In particular, the techniques herein provide a virtual solution that changes the view of an average Internet user that the "cloud" is something "out there" but rather that is "everywhere". That is, the techniques abstract and virtualize symmetrically, e.g., bringing the home (storage) closer to the Internet, and bringing the Internet (cloud) closer to the home network and devices therein, in a manner that is generally transparent to the user. Furthermore, the techniques herein offer advantages over cloud storage, since local storage is more efficient in terms of bandwidth, and also over traditional local storage (network attached storage, "NAS"), since access from anywhere is simplified without port forwarding and firewall issues generally associated with configuring traditional local storage, as may be appreciated by those skilled in the art. Note that the techniques herein are particularly useful to home networks that do not have IPv6 routers and IPv6 NAS.

While there have been shown and described illustrative embodiments that provide Internet presence for a home network, it is to be understood that various other adaptations and modifications may be made within the spirit and scope of the embodiments herein. For example, the embodiments have been shown and described herein with relation to current network technologies, such as IPv6, broadband, etc. However, the embodiments in their broader sense are not as limited, and may, in fact, be used with other types of network and/or communication protocols. For example, while the device 200 may generally be applicable as an IPv6 device, it may be configured to operate within the bounds of IPv4 network protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   interconnecting a first interface of a switch with a broadband modem within a wide area network (WAN);
   interconnecting a second interface of the switch with a WAN interface of a router, wherein the router provides a gateway between the WAN and a local area network (LAN);
   interconnecting a third interface of the switch with the LAN;
   obtaining a private LAN address for the switch;
   providing a web server at the switch, the web server reachable to the WAN on the first interface and to the LAN on the second interface;
   inspecting traffic received at the first and second interfaces;
   determining, based on the inspecting, whether to transparently forward the traffic between the first and second interfaces or to redirect the traffic to the web server;
   obtaining one or more files from a remote WAN-based server at the web server; and providing local access to the one or more files from the web server to a device within the LAN,
wherein the web server is accessible by a user from both inside the LAN and outside the LAN, and
wherein the switch resides logically on a WAN side of the router.

2. The method as in claim 1, wherein inspecting and determining are one of either per-packet or per-session.

3. The method as in claim 1, further comprising:
providing storage associated with the web server accessible to the WAN and the LAN.

4. The method as in claim 3, wherein the storage is selected from one or more of internal storage, local external storage, and WAN-based external storage.

5. The method as in claim 1, further comprising:
attaching a LAN interface of the router to the third interface of the switch, the third interface being logically isolated from the first and second interfaces.

6. The method as in claim 5, further comprising:
allowing for local configuration of one or both of the switch and the web server from within the LAN via the third interface.

7. The method as in claim 5, wherein the third interface is one of either a wired interface or a wireless interface.

8. The method as in claim 1, wherein the remote WAN-based server is a remote web server interconnected between a remote broadband modem and a remote router.

9. The method as in claim 1, wherein the switch is physically collocated with one of either the broadband modem or the router.

10. An apparatus, comprising:
a first interface configured to interconnect with a broadband modem within a wide area network (WAN);
a second interface configured to interconnect with a WAN interface of a router, wherein the router provides a gateway between the WAN and a local area network (LAN);
a third interface configured to interconnect with the LAN;
a web server, the web server reachable to the WAN on the first interface and to the LAN on the second interface; and
a process executed by a processor, and configured to obtain a private LAN address for the switch, inspect traffic received at the first and second interfaces, determine, based on inspecting, whether to transparently forward the traffic between the first and second interfaces or to redirect the traffic to the web server, obtain one or more files from a remote WAN-based server at the web server, and provide local access to the one or more files from the web server to a device within the LAN,
wherein the web server is accessible by a user from both inside the LAN and outside the LAN, and
wherein the apparatus resides logically on a WAN side of the router.

11. The apparatus as in claim 10, wherein the process is configured to inspect and determine on one of either a per-packet or a per-session basis.

12. The apparatus as in claim 10, further comprising:
storage associated with the web server accessible to the WAN and the LAN.

13. The apparatus as in claim 12, wherein the storage is selected from one or more of internal storage, local external storage, and WAN-based external storage.

14. The apparatus as in claim 10, wherein the third interface is attached to a LAN interface of the router, the third interface being logically isolated from the first and second interfaces.

15. The apparatus as in claim 14, wherein the process is configured to allow for local configuration of one or both of the process and the web server from within the LAN via the third interface.

16. The apparatus as in claim 14, wherein the third interface is one of either a wired interface or a wireless interface.

17. The apparatus as in claim 10, wherein the remote WAN-based server is a remote web server interconnected between a remote broadband modem and a remote router.

18. The apparatus as in claim 10, wherein the apparatus further comprises the broadband modem.

19. The apparatus as in claim 10, wherein the apparatus further comprises the router.

20. A system, comprising:
a broadband modem within a wide area network (WAN);
a router configured to provide a gateway between the WAN and a local area network (LAN); and
a switch having a first interface interconnected with the broadband modem, a second interface interconnected with a WAN interface of the router, a web server reachable to the WAN on the first interface and to the LAN on the second interface, a third interface configured to interconnect with the LAN; and a process stored thereon, the process configured to obtain a private LAN address for the switch, inspect traffic received at the first and second interfaces, determine, based on inspecting, whether to transparently forward the traffic between the first and second interfaces or to redirect the traffic to the web server, obtain one or more files from a remote WAN-based server at the web server, and provide local access to the one or more files from the web server to a device within the LAN,
wherein the web server accessible by a user from both inside the LAN and outside the LAN, and
wherein the switch is logically on a WAN side of the router.

* * * * *